April 18, 1967 N. L. LAGASSE ETAL 3,314,680
DYNAMIC SELF-CONTAINED MINIMUM ENVELOPE FACE-TYPE SEAL
Filed Nov. 12, 1964
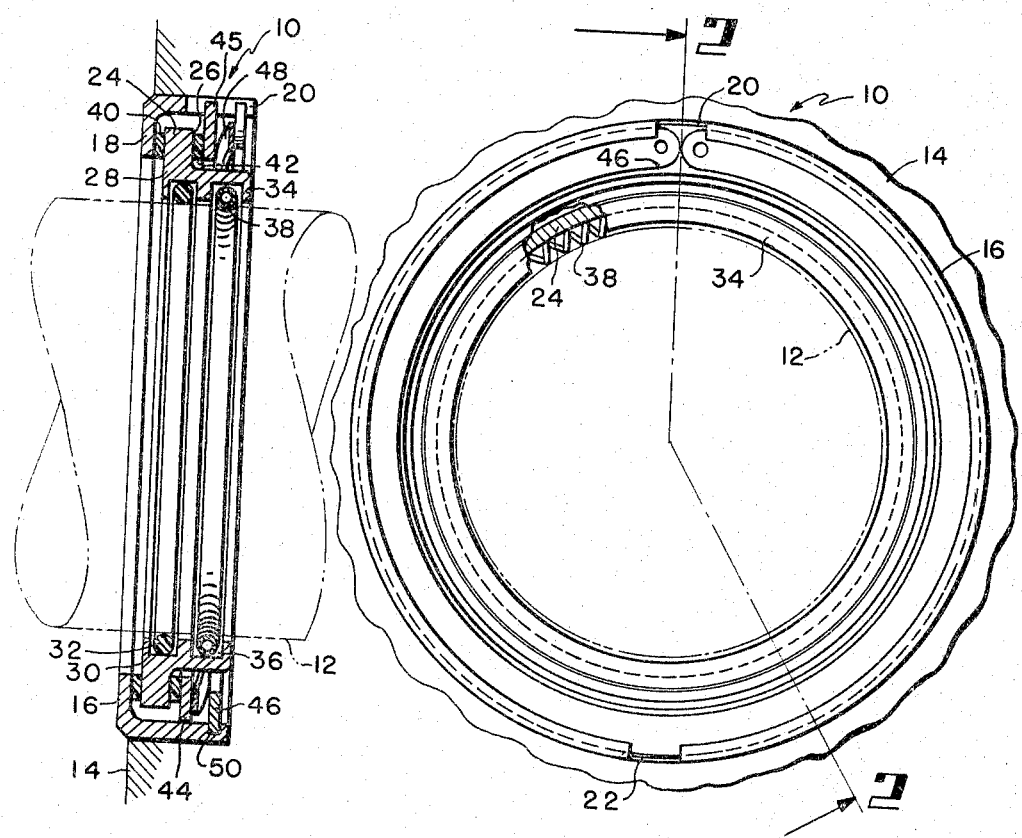
INVENTORS.
NORMAND L. LAGASSE
JERALD L. PARK
BY Alden D. Redfield
Irwin P. Garfinkle
ATTORNEYS.

United States Patent Office 3,314,680
Patented Apr. 18, 1967

3,314,680
DYNAMIC SELF-CONTAINED MINIMUM
ENVELOPE FACE-TYPE SEAL
Normand L. Lagasse, Bridgeport, and Jerald L. Park, Stratford, Conn., assignors to Avco Corporation, Stratford, Conn., a corporation of Delaware
Filed Nov. 12, 1964, Ser. No. 410,601
5 Claims. (Cl. 277—41)

This invention relates to a self-contained dynamic face-type shaft seal incorporating a one-way shaft clutch mechanism.

Two types of dynamic seals are generally used for shaft sealing. These are face-type and lip-type seals. Face-type seals have several advantages; for example, the face contact pressure can be controlled; the seal has high speed capability; and it has pressure balance capability, that is, seals can be designed for operation under differential pressures. The lip-type seal has several advantages over the conventional face-type seal; for example, its axial length is generally shorter; it requires no shimming or stacking up for installation; it has lower cost; and it is not as susceptible to handling damage as conventional face-type seals.

It is an object of this invention to combine the advantages of the conventional face-type and lip-type seals in a unique self-contained face-type seal incorporating a one-way clutch.

Another object of this invention is to provide a self-contained face-type seal including a self-contained clutch, and which requires no coaction with any element outside of the self-contained seal for preloading.

Another object of this invention is to provide a self-contained face-type drive seal unit which is internally spring loaded and which includes a sprag-type clutch in the form of a garter-type coil spring.

Another object of this invention is to provide a dynamic face-type seal which is reduced in size over conventional types.

Another object of this invention is to provide a face-type seal which can replace conventional lip-type seals without rework of the equipment being sealed.

Other objects of this invention are to provide a face-type seal which is self-cooling, which can be installed as an assembly, and which reduces the number of components required in conventional face-type seals.

For a better understanding and for further objects and advantages of this invention, reference should now be made to the following detailed specification and to the accompanying drawing in which:

FIGURE 1 is an end view of the face-type seal assembly embodying the features of this invention;

FIGURE 2 is a cross sectional view taken through the line 2—2 of FIGURE 1; and

FIGURE 3 is a top view of FIGURE 1.

The numeral 10 generally indicates the novel face-type seal in an application for providing a seal between a shaft 12 and a housing 14. The housing 14 may be the enclosure for equipment such as a motor, transmission, pump, or other similar rotating apparatus.

All of the components of the seal 10 are mounted within an annular metal housing 16 having a flange 18 at one end. In addition, the housing 16 is provided with diametrically opposed slots 20 and 22 radially extending from the other end which is generally open.

The rotor for the seal comprises an annular seal ring 24 having an inner end face 26 and an outer end face 28. An O-ring groove 30 is machined on the inner periphery of the ring 24 to accommodate the conventional compressible O-ring seal 32. The ring 24 is also provided with a reduced diameter extension 34 on the inner periphery of which is machined a similar groove 36 for containing a sprag-type one-way clutch 38 in the form of an annular coil spring.

The stator portion of the seal 10 includes an outer seal face 40 bonded to the inner surface of the flange 18, and an inner seal face 42 bonded to a thrust ring 44. The thrust ring 44 is provided with radial tabs 45 which extend into the axial slots 20 and 22.

In addition, the seal includes a slit retaining ring 46 of the spirolox type for containing the various parts under the pressure of a spring 48 of the wavy washer type. The retaining ring 46 is axially fixed in a circumferential groove 50.

In assembling the seal, the rotor or seal ring 24 containing the O-ring seal 32 and the clutch 38 are inserted through the open inner end of the housing 16. The thrust ring 44 is next installed by inserting its tabs 45 into the slots 20 and 22. The spring 48 is retained by the retaining ring 46 which is axially fixed within the circumferential groove 50. Thus, a self-contained seal is provided in which contact pressure is established without need for cooperation with any outside element.

The now self-contained seal 10 may be press fit into the housing 14 and slid onto the shaft 12. Thus installed, leakage is prevented between the ring 24 and the shaft 12 by means of the O-ring seal 32. The seal between the ring 24 and the housing 16 is provided by the outer seal 40 and the end face 28. The inner seal 42 does not provide an effective seal because of the centrifugal action of the seal ring with respect to the contained lubricant, but primarily serves as a lubricated rotating thrust surface. On the other hand, the centrifugal action of the seal ring against the lubricant aids in providing a seal at the outer seal face 40.

As previously indicated, the clutch 38 is a conventional annular coil spring (or garter-type spring) which is positioned within a groove 36 in a manner similar to the O-ring seal 32. As in the case of the O-ring seal 32, the cross-sectional diameter of the clutch 38 is somewhat greater than the depth of its groove but is compressible between the seal ring 24 and the shaft 12. When the seal 10 is installed in the shaft 12, the convolutions of the clutch 38 are wedgedly engaged in driving relationship against the shaft, but only in one direction. That is to say, if when installing the seal 10 the seal is rotated clockwise with respect to the shaft, the convolutions will be wedged in a direction so that there will be no engagement of the shaft so long as the shaft runs clockwise. On the other hand, counterclockwise rotation of the shaft will engage the wedged convolutions of the clutch as will the inner surface of the extension 34, and the rotor 24 will be driven counterclockwise.

Note that with the foregoing arrangement the seal 10 may be positioned at any point along the shaft. Also, the shaft requires no additional cooperating members such as stops for engaging the spring 48, or grooves for engaging the clutch 38. Furthermore, the simple clutch mechanism eliminates the need for complex clutching arrangements or, in the alternative, eliminates the need for parts external of the seal for providing the necessary engagement with the shaft.

Thus, there has been provided a face-type seal which in its outer configuration and in its utility may replace the conventional lip-type seal without any modification to existing equipment. It should also be noted that by bonding the outer seal face 40 to the inner surface of the housing flange 18, the need for a conventional static seal and the parts necessary to mount the seal 40 are eliminated. The inner seal 42 which is bonded to the thrust ring 44 is used to provide the pressure between the rotor 24 and the face of the outer seal 40.

The materials used for the inner and outer faces 40 and 42 may be carbon impregnated Teflon or molybdenum disulphide impregnated Teflon, the latter being particularly useful for sealing a silicon oil. Other materials are also available, depending upon the application.

Various modifications and adaptations will at once become apparent to persons skilled in the art; for example, the retaining ring 46 could be replaced by a flange on the housing 16, and the relative positions of the drive spring clutch 38 and O-ring seal 32 could be interchanged. Moreover, other types of springs could be substituted for the spring 48, and retaining ring 46 could be made integral. It is, therefore, intended that this invention be limited only by the appended claims as interpreted in the light of the prior art.

What is claimed is:

1. In a self-contained dynamic seal, the combination comprising:
   an annular housing having an end wall and a circular shaft receiving aperture in said end wall;
   a first annular end face seal bonded to said end wall interior of said housing and concentric with said aperture;
   an annular seal ring concentrically positioned within said housing, said seal ring having first and second annular end faces and a circular shaft receiving aperture;
   an angularly fixed, axially movable annular thrust ring plate concentrically positioned within said housing;
   a second annular end face seal bonded to said thrust ring;
   compression means contained within said housing for axially urging said thrust ring and said second annular face seal against said second annular end face and for urging said first end face against said first annular end face seal to provide a seal between said first annular end face seal and said first end face of said seal ring;
   an annular groove in said ring around the periphery of said circular aperture; and
   an O-ring seal in said groove, said O-ring seal being compressible between said circular shaft and said ring to provide a seal therebetween when said dynamic seal is installed on said shaft.

2. The invention as defined in claim 1, and a second annular groove in said ring around the periphery of said circular aperture; and
   a circular coil spring in said second groove, said spring being wedgable between said ring and said shaft when said dynamic seal is installed on said shaft, whereby said shaft and ring are drivingly connected when said shaft is rotated in one direction.

3. The invention as defined in claim 2 wherein said compression means contained within said housing comprises a retaining ring fixed within said housing adjacent the end of said housing opposite said end wall and a spring compressed between said retaining ring and said thrust plate.

4. The invention as defined in claim 3 wherein said spring is an annular wavy washer.

5. The invention as defined in claim 4 wherein said housing is provided with axially extending slots, and wherein said thrust ring is provided with radial extensions extending into said slots, whereby said thrust ring is angularly fixed.

References Cited by the Examiner

UNITED STATES PATENTS

| | | | |
|---|---|---|---|
| 2,756,080 | 7/1956 | Andresen et al. | 277—81 X |
| 3,090,629 | 5/1963 | Lee et al. | 277—95 |
| 3,108,816 | 10/1963 | Moore | 277—96 X |
| 3,250,539 | 5/1966 | Kurz et al. | 277—41 |

FOREIGN PATENTS

| | | |
|---|---|---|
| 107,422 | 6/1917 | Great Britain. |

SAMUEL ROTHBERG, *Primary Examiner.*